United States Patent [19]

Güldenpfennig

[11] 3,878,145
[45] Apr. 15, 1975

[54] PROCESS FOR PRODUCING WATER-DILUTABLE COATING COMPOSITIONS SUITABLE FOR ELECTROCOATING

[75] Inventor: Rolf Güldenpfennig, Bammental, Germany

[73] Assignee: Reichhold-Albert-Chemie Aktiengesellschaft, Hamburg, Germany

[22] Filed: May 7, 1973

[21] Appl. No.: 358,117

Related U.S. Application Data

[63] Continuation-in-part of Ser. No. 182,237, Sept. 20, 1971, abandoned, which is a continuation-in-part of Ser. No. 41,684, May 25, 1970, abandoned, which is a continuation of Ser. No. 532,867, March 9, 1966, abandoned.

[30] Foreign Application Priority Data

Mar. 13, 1965 Germany............................ 1595227

[52] U.S. Cl.......... 260/18 EP; 204/181; 260/22 EP; 260/24; 260/29.2 EP
[51] Int. Cl... C08g 30/04; C08g 30/12; C08g 33/18
[58] Field of Search........ 260/18 CL, 18 EP, 22 EP, 260/29.2 EP, 24; 204/181

[56] References Cited
UNITED STATES PATENTS

| | | | |
|---|---|---|---|
| 2,681,894 | 6/1954 | Hoenel | 260/842 X |
| 3,300,424 | 1/1967 | Hoenel | 260/18 CL |
| 3,305,501 | 2/1967 | Spalding | 260/29.2 EP |
| 3,308,077 | 3/1967 | Pattison | 260/18 CL |
| 3,355,401 | 11/1967 | Tanner | 260/18 EP |

Primary Examiner—Donald E. Czaja
Assistant Examiner—C. Warren Ivy
Attorney, Agent, or Firm—Gordon W. Hueschen

[57] ABSTRACT

A method for producing water-dilutable coating compositions suitable for electrocoating which comprises partially esterifying glycidylethers based on 2,2-(4) hydroxyphenylpropane containing epoxy groups or hydroxyl groups produced by hydrolytic dissociation of said epoxy groups, with at least one monocarboxylic acid, in the ratio of about 1:1 of carboxyl groups to epoxy groups, further esterifying said partial esters with polybasic carboxylic acids and neutralizing the product with strong nitrogen bases in the presence of water, the improvement comprising preparing said polybasic carboxylic acids without anhydride groups by:

a. forming an adduct of maleic acid or maleic anhydride with a fatty acid selected from the group consisting of saponified natural drying oil, saponified natural semi-drying oil, tall oil fatty acids or dehydrated castor oil fatty acids wherein the reaction between said maleic acid or maleic anhydride with said fatty acid is continued to an unreacted maleic acid or maleic anhydride concentration lower than 2 percent by weight and the molar ratio of said fatty acid to said maleic acid or maleic anhydride is between 0.9 : 1 and 1.1 : 1 and b. hydrolyzing said adduct to form said polybasic acids without anhydride groups.

8 Claims, No Drawings

PROCESS FOR PRODUCING WATER-DILUTABLE COATING COMPOSITIONS SUITABLE FOR ELECTROCOATING

CROSS - REFERENCE TO RELATED APPLICATIONS

This is a Continuation-In-Part of application Ser. No. 182,237, filed Sept. 10, 1971 and now abandoned, which in turn is a Continuation-In-Part of the application Ser. No. 41,684, filed May 25, 1970, now abandoned, which is a streamlined continuation application of application Ser. No. 532,867 filed Mar. 9, 1966, now abandoned. The priority of the German patent application Ser. No. P 15 95 227.9 (R 40109), filed Mar. 13, 1965 is claimed.

BACKGROUND OF THE INVENTION

1. Field of the Invention

It is an object of this invention to provide a method for producing water-dilutable coating compositions suitable for electrocoating.

The new epoxy resin esters produced according to the invention, are suitable as binders for water-dilutable, predominantly oven-drying lacquer solutions, which provide high quality coatings not only when applied in customary ways, such as spraying, dipping, pouring, etc., but especially also when being applied accordingly to the invention as electrophoretically precipitable lacquer binders. The coating compounds made according to the invention are especially suitable for the application as coating compounds electrophoretically precipitable according to the invention, when the water-containing electrophoresis bath has a solids content of 5 to 30 % by weight.

2. Prior Art

The U.S. Pat. No. 3,355,401 to Tanner and the French Pat. No. 1,388,543 to Tanner claim a process for the manufacture of water-thinnable coating compositions which comprises condensing a glycidyl polyether with a combination of at least two acidic materials one being a monobasic fatty acid and the other being a dimerized fatty acid.

As is shown by the U.S. Patent to Tanner by the polybasic fatty acids also tribasic fatty acids should be understood, for instance the commercial acids and mixtures with the general formula:

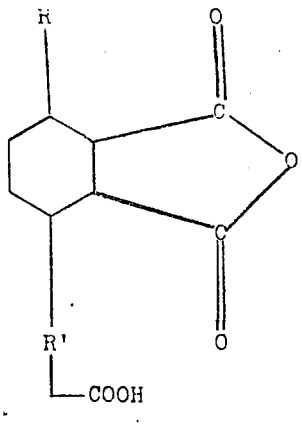

R representing a pentyl or hexyl group and R' the rests—$(CH_2)_7$— or —$(CH_2)_8$—.

In example 4 of the U.S. Pat. No. 3,555,401, a tribasic fatty acid of the general formula

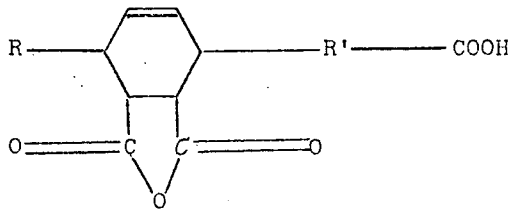

is mentioned, R being a pentyl or hexyl group and R' a polymethylene chain with 7 or 8 carbon atoms. The commercial product of the given formula mentioned is "Admerginat A 1". Admerginat (R) is a trademark for maleic acid anhydride adducts of isomergin acids or Isomerginat respectively and correspond to the given formula. (See the firm's print "Admerginate" der Harburger Fettchemie Brinckmann & Mergell GmbH). Isomergin acids is a trademark for isomerized fatty acids, and Isomerginat is a trademark for isomerized fatty acid methyl esters (see: F. Weghorst, J. Baltes, Fette. Seifen. Anstrichmittel 67, 447–449, 1965). Furthermore, it is stated in the French Pat. No. 1,388,543 that the amounts of mono- and polybasic fatty acids, expressed in chemical equivalent weights, could be below, above, or equal to, those corresponding to the equivalent weight of the epoxy resin. In this case, the equivalent weight of the epoxy resin is defined as weight in grams of the resin, which is required to completely esterify one mol of a monobasic acid. It is furthermore stated that the esterification with the polybasic fatty acids preferably takes place following the esterification with the monobasic fatty acids, especially when tribasic acids are employed.

Now it has been ascertained, when accomplishing Example No. 4 of U.S. Pat. No. 3,355,401 and when producing other resins according to Patent Claim 1, that in most cases the gelling of the preparation already took place during the warming time with the tribasic fatty acids of the general formula given, especially when epoxy resins with low equivalent weight and many epoxy groups were applied and the percentage of monobasic fatty acids was about the same or lower than the percentage of the tribasic carboxylic acids.

This result agrees with the statement made in the Belgian Pat. No. 637,097, where especially on page 12 it is said that only adducts of fumaric acid to fatty acids of drying or semi-drying oils are suitable for the conversion with epoxy resins, while adducts of alpha, beta-ethylenically unsaturated dicarboxylic acids, which can form anhydrides, are too likely to form anhydrides on fatty acids of drying or semi-drying oils, being thus unsuitable, as anhydrides are agents for the polymerization of epoxy resins.

As to Tanner's recognition of the problem resulting from the use of acidic material, which might form anhydrides, he discloses in column 2, line 31 to 33, that "tribasic acids . . . tend to cross link the product", although he did not say why that is so. For esterification in the second stage Tanner uses a polybasic acidic material. By characterizing this acidic material he does not differentiate between adducts of dibasic acids or acid anhydrides with a fatty acid. Since acid anhydrides are known curing agents of epoxy resins, crosslinking should occur when these anhydride fatty acid adducts are used for esterification of the epoxy resin. However, when a unsaturated dibasic acid is employed for the production of the adduct, the formation of the acid anhydride during this reaction cannot be avoided.

According to U.S. Pat. No. 2,033,131, page 2, column 2, lines 24 to 41, the adduct formation works with reasonable speed only at a temperature where the employed maleic acid converts to its anhydride, and the obtained adduct therefore contains anhydride groups even when the acid is used as starting material.

The examples of the present invention show that the process of this invention is preferably carried out with the use of maleic anhydride which is being hydrolyzed after adduct formation with the fatty acid so as to avoid undesired side reactions during esterification with the epoxy resin.

For the above-mentioned reasons the content of free maleic acid or maleic anhydride in the finished adduct has also to be kept as low as possible before esterifying the epoxy resin. The examples of this invention therefore state the amount of free unreacted maleic acid in the adduct to be below 2 % by weight. Carrying out the process of U.S. Pat. No. 3,355,401 to Tanner is very critical since three out of five reaction mixtures gel after 30 to 60 minutes reaction time in the second stage. The gelling starts long before complete esterification of the epoxy resin took place and before the esterified product became water-soluble. After complete esterification the obtained product is highly viscous and is practically not capable of being pumped into technical installaltions for electrophoretic deposition. If one succeeds in electrocoating by use of this product, the thickness of the achieved layers is too small to secure corrosion resistive properties, as can be seen in the comparison tests 4 and 5 in the specification of this invention.

The U.S. Pat. No. 3,305,501 to Spalding claims a process for the preparation of water-soluble epoxy esters which comprises reacting an unsaturated fatty acid and fumaric acid to form an adduct and subsequently esterifying a glycidyl polyether using this adduct. Spalding has recognized the difficulties that arise from the use of acid anhydrides for the adduct formation (column 4, lines 14 to 21) and therefore uses an acid which does not form an anhydride according to conventional teaching. However, the textbook for organic chemistry, Hans Beyer, S. Hirzel Verlag Leipzig, 1968, fifteenth edition, states on page 268 that by heating to about 300°C fumaric acid converts to maleic acid which forms maleic anhydride immediately. By this citation an explanation might be given for the fact that the reaction mixture of the above fumaric acid/fatty acid adduct often also gels during esterification with the glycidyl polyether.

In the German Displayed Specification No. 1,443,712 Spalding himself shows in Comparison Test A, column 9, that the reaction mixture might gel when fumaric acid is reacted with the glycidyl ether of linseed-oil acid ester. The coating compositions of Spalding have been tested in comparison tests 2 and 3 in the present specification. Relatively high viscous products are obtained and the use of such adducts results in gelling when using systems with many epoxide groups.

In order to avoid gelling of the reaction mixture during esterification Spalding did employ what he thought to be a nonanhydride forming acid but he did not suggest using the more readily available maleic acid or maleic anhydride and hydrolyzing the adduct before esterification takes place.

Also for this reason the present invention fills a technological gap in the field of producing water-dilutable coating compositions suitable for electrodeposition. Since tribasic acids have proven superior in rendering the end product water-soluble over dibasic acids normally employed, the present invention has supplied a valuable method of making such products having superior qualities especially for electrophoretic deposition.

The U.S. Pat. No. 3,308,077 to Pattison claims an aqueous coating composition containing a salt of a resinous ester obtained by partially esterifying a polyol firstly using a drying oil fatty acid and then esterifying using a maleinized fatty acid and neutralizing the ester. According to Pattison (see column 4, last line up to column 5, line 1) the adduct is prepared "by heating an equimolecular mixture of maleic anhydride and tall oil fatty acid at 400° F for 3.5 hours". This means that a considerably high content of maleic anhydride and of unsaturated fatty acid are present in the adduct in reacted form. (See Comparison Test).

The use of the adducts according to Pattison leads to resins which after neutralization and dilution result in films having uneven surfaces and crater formation after electrophoretic deposition on account of the presence of free maleic anhydride which builds up in the bath. This is shown in comparison test 6 of the present invention.

The U.S. Pat. No. 3,297,557 to Huggard claims a method of coating a body with a weather-resistant coating composition comprising a salt of a base with the reaction product of an aliphatic unsaturated carboxylic acid with a polyester. Huggard makes an adduct of a fatty acid and fumaric acid which adduct is neutralized and mixed with a resinous polyol being an hydroxyl-functional resinous polyester. No esterification product of an epoxy resin is obtained and the products of huggard are according to their chemical structure not comparable with the products of the present invention.

The U.S. Pat. No. 2,941,968 to McKenna claims a method of forming a water dispersible material consisting of glyceride drying oil and maleic anhydride which reaction product is hydrolyzed and thereafter is heated with styrene, vinyl toluene or alpha methyl styrene to form a liquid interpolymer. According to McKenna a mixture of a neutralized adduct and a styrene monomer is produced and copolymerized until water dispersible. No epoxy resin coating composition suitable for electrophoretic deposition is obtained by the method of McKenna and the products can therefore not be compared with the products made in accordance with the method claimed in this invention.

SUMMARY

The present invention concerns a method for producing water-dilutable coating compositions suitable for electrocoating which comprises partially esterifying glycidylethers based on 2,2 bis (4) hydroxyphenylpropane containing epoxy groups or hydroxyl groups produced by hydrolytic cleavage of said epoxy groups, with at least one monocarboxylic acid, in the ratio of about 1:1 of carboxyl groups to epoxy groups, further esterifying said partial esters with polybasic carboxylic acids and neutralizing the product with strong nitrogen bases in the presence of water, the improvement comprising preparing said polybasic carboxylic acids without anhydride groups by:

a. forming an adduct of maleic acid or maleic anhydride with a fatty acid selected from the group consisting of saponified natural drying oil, saponified natural semi-drying oil, tall oil fatty acids or dehydrated castor oil fatty acids wherein the reaction between said maleic acid or maleic anhydride with said fatty acid is continued to an unreacted maleic acid or maleic anhydride concentration lower than 2 percent and the molar ratio of said fatty acid to said maleic acid or maleic anhydride is between 0.9:1 and 1.1:1; and b. hydrolyzing said adduct to form said polybasic acids without anhydride groups.

Such "polybasic carboxylic acids" not exactly to be defined and not containing any anhydride groups are obtained by hydrolyzing the adducts of anhydrides, $\alpha,\beta$-ethylenically unsaturated dicarboxylic acids to unsaturated fatty acids. A hydrolysis is also necessary when adducts of $\alpha,\beta$-ethylenically unsaturated dicarboxylic acids to unsaturated fatty acids have been produced under conditions which do not exclude the formation of anhydrides. For instance, the hydrolysis can be so effected that the adduct containing anhydride groups is brought to reaction with water at 100°C. It is recommended to apply one mol water per mol of dicarboxylic acid applied and furthermore a surplus of one mol water. The hydrolysis is followed by the rising of the acid number. It is terminated as soon as the acid number does not rise by more than 5 units per hour. As a rule, this is obtained after 2 hours of reaction time at 100°C.

By water-dilutable coating compounds such products should be understood which are soluble or dispersible in water either along or at least with an addition of a subordinated amount of an organic solvent miscible infinitely or to a large extent in water, such as mono- and diether of etylene glycol, and diethylene glycol with low monovalent alcohols as methanol, ethanol, propanol, butanol, such as methyl glycol, ethyl glycol, propyl glycol, isopropyl glycol, butyl glycol, diethylene glycol diethyl ether, also diacetone alcohol, low ketones, such as acetone, methyl ethyl ketone, methyl isobutyl ketone. Colloidal solutions should be formed preferably.

Polyethers containing epoxy groups are obtained by etherifying a divalent alcohol or diphenol with epichlorohydrin or dichlorohydrin, in the presence of alkali. These compounds may derive from glycols, such as ethylene glycol, diethylene glycol, triethylene glycol, propylene glycol-1,2, propylene glycol-1,3 butylene glycol-1,4, pentane diol-1,5, hexane diol-1,6 and especially from diphenols, such as resorcin, pyrocatechin, hydrochinone, 1,4-dihydroxy naphthalene, bis-(4-hydroxy phenyl)-methane, bis-(4-hydroxy phenyl)-methylphenyl methane, bis-(4-hydroxy phenyl)-tolyl methane, 4,4'-dihydroxy diphenyl and 2,2-bis-(4-hydroxy phenyl)-propane.

The polyethers containing epoxy groups have the following general formula

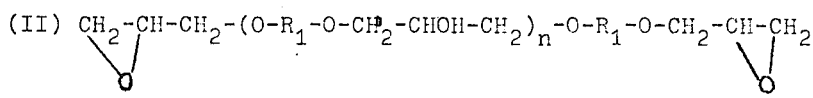

$R_1$ being an aliphatic or aromatic carbon residue and $n = 0$ or a small number.

Polyethers suited best for the present invention have the general formula:

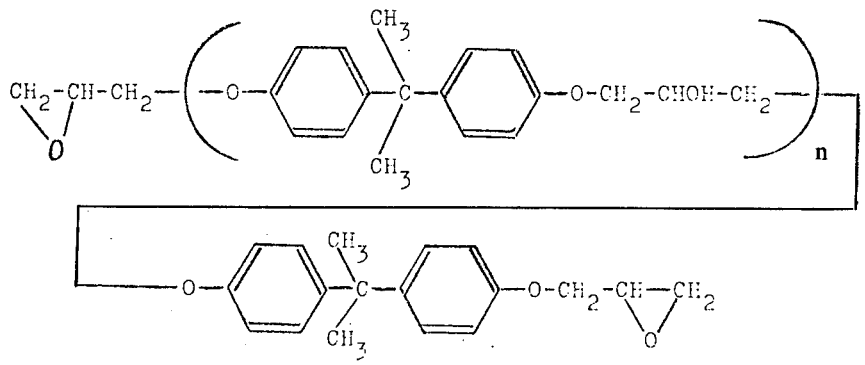

which contain 2,2-bis-(4)-hydroxy phenyl-propane as initial compound, of which preferably such polyethers are used which have a molecular weight of between approximative 380 and 3500.

For electrophoretically precipitable coating compositions, the polyethers with a molelcular weight of between 380 and approx. 900 are especially suited. Those with a higher molecular weight are also adequate, they too provide highly corrosion resistant films, but it is more difficult to obtain thick layers. For water-dilutable coating compositions, which are applied by customary means, such as dipping, spraying, flooding, pouring, spreading, polyethers with a higher molecular weight are preferred.

Furthermore, polyglycidyl ethers may be used, derived from tri- and polyhydroxyl compounds. Such may be trimethylol propane triglycidyl ether, trimethylol ethane triglycidyl ether, glycerol triglycidyl ether, pentaerythrite triglycidyl ether, pentaerythrite tetraglycidyl ether or polyglycidyl ether of esters of polyvalent alcohols with hydroxy acids, such as di- or triglycidyl ether of the triricinoleates or the castor oil respectively.

Among the polyglycidyl ethers, those which are obtained in a known manner (DAS No. 1,184,496, DBP No. 1,138,542) by the reaction of novolacs on the basis of phenol, cresol, xylenol, or bis-phenols with epichlorohydrin are well suited. Other epoxies and/or epoxy resins with epoxy groups, eventually hydroxyl groups with a molecular weight of up to approx. 3000 have been described in a large number in the book "Epoxydverbindungen und Epoxydharze" by A. M. Paquin, Springer-Verlag 1958, Berlin, Goettingen, Heidelberg.

It should be referred to the fact that the compounds named may usually be also used when the epoxy groups have already been decomposed hydrolytically, i.e. that there are already hydroxyl groups present.

As monobasic carboxylic acids, aromatic and/or hydroaromatic and/or heterocyclic and/or aliphatically straight chained and/or ramified chained, unsaturated and/or saturated monocarboxylic acids are suitable. The greater importance should be given to the group of the aliphatically straight chained and/or ramified chained saturated and/or unsaturated monocarboxylic acids. As monobasic aliphatic carboxylic acids, the following are suitable: straight and/or ramified chained, saturated and/or unsaturated fatty acids with 1 to 40 carbon atoms, such as acetic acid, propionic acid, caprylic acid, caprinic acid, isooctanic acid, nonanic acid, isononanic acid, undecanic acid, lauric acid, myristic acid, palmitic acid, palmitoleinic acid, petroselinic acid, stearic acid, oleic acid, elaidic acid, 9,12-linoleic acid, 9,11-linoleic acid, (in the cis, cis-trans and trans form), linolenic acid, elaeostearic acid, arachic acid, behenic acid, lignocerenic acid, euruca acid, arachidonic acid, clupanodonic acid, $\alpha$-parinaric acid, $\alpha$-licanic acid, or their anhydrides respectively, alone or in a mixture. Preferred are fatty acid mixtures, such as obtained from natural vegetable and animal fats, such as cotton seed oil, peanut oil, wood oil, maize oil, oiticica oil, olive oil, poppy seed oil, boleko oil, palm oil, palmnut oil, olive seed oil, perilla oil, colza oil, coconut oil, sunflower oil, walnut oil, grapeseed oil, sardine oil, herring oil, menhaden oil, trane oil, lard, beef suet, especially linseed oil, soy bean oil, coconut oil, and safflower oil.

Furthermore, technical fatty acids may be used, especially tall oil fatty acids, chemically treated fatty acids or fatty acids from chemically treated fats, especially dehydrated castor oil fatty acids, or fatty acids conjugated by catalytic processes or fatty acids from catalytically conjugated fats, especially conjugated linseed oil, soy bean oil, safflower oil, fatty acids, fatty acids elaidinated fats, hydrogenized or partially hydrogenized fatty acids or fatty acids from hydrogenized or partially hydrogenized fats, e.g. fish oils, as well as rosin acids, especially colophonium and/or hydrogenized and/or partially hydrogenized resin acids, especially hydrogenized and/or partially hydrogenized colophonium or mixtures of such acids or acid mixtures of the above-named type with each other.

By monobasic carboxylic acids there should also be understood partial esters of polybasic carboxylic acids which contain one free carboxyl group only, such as monoesters of amber acid, glutaric acid, adipic acid, pimelic acid, suberic acid, azelaic acid, sebacic acid, especially partial esters of dimerized or oligomerized unsaturated fatty acids and/or partial esters of such "tricarboxylic acids" not exactly definable, which result from adduct formation of $\alpha,\beta$-unsaturated dicarboxylic acids or their anhydrides respectively to unsaturated fatty acids, as described in greater detail below, with preferably straight chained saturated aliphatic alcohols with 1 to 20 carbon atoms, such as methanol, ethanol, propanol, especially butanol, pentanol, hexanol, etc. Methanol is preferred.

Bakeable coating compounds with excellent properties are obtained when phenol carboxylic acids condensable with formaldehyde are used alone or in a mixture with the previously named as monobasic carboxylic acids. Among these, 4,4-bis-(4)-hydroxy phenylvalerianic acid has a special significance.

Furthermore, it has been found that instead of monobasic carboxylic acids, which are bonded to the epoxy resin by esterification, compounds containing monohydroxyl groups can be inserted by etherification, in the proportion in which epoxy groups are contained in the epoxy resin, i.e. one hydroxyl group can be bonded per epoxy group. As compounds containing hydroxyl groups, rosin alcohols and especially higher fatty alcohols, such as lauryl alcohol, myristyl alcohol, palmityl alcohol, stearyl alcohol, but also esters of hydroxy fatty acids, such as ricinoleic acid ester, hydroxy stearic acid ester.

As polybasic carboxylic acids, the "tricarboxylic acids" not exactly to be defined, are applied, which have been formed either alone or in a mixture by the addition of $\alpha,\beta$-unsaturated dicarboxylic acids or their anhydrides respectively, as far as these can be formed, such as maleic acid, or maleic anhydride, wherein maleic anhydride being preferred, to unsaturated fatty acids, such as palmitoleic acid, petroselinic acid, oleic acid, elaidinic acid, cis-cis-, cis-trans; trans-trans- 9,12-linoleic acid, linolenic acid with isolated and conjugated double bondings, elaeostearic acid, euruca acid, arachidonic acid, clupanodonic acid, licanic acid, parinaric acid. Especially fatty acid mixtures are used of unsaturated fatty acids, as are obtained from natural vegetable and animal unsaturated fats by saponification, such as fatty acids from cotton seed oil, lupine oil, maize oil, colza oil, sesame oil, grapeseed oil, walnut oil, perilla oil, linseed oil, wood oil, oiticica oil, especially soy bean oil, poppy seed oil, sunflower oil, safflower oil, eminently suitable are furthermore unsaturated technical fatty acids, especially tall oil fatty acids. Of the chemically treated fatty acids or fatty acids of chemically treated oils, especially fatty acids from dehydrated castor oil are suitable. Furthermore, rosin acids such as colophonium or partially hydrogenized rosin acids are suitable as unsaturated acids, as a rule, however, only as addition to the fatty acids named of up to approx. 50 %. The fatty acids mentioned may be used alone or mixed with each other.

The adduct formation is effected according to the known methods by heating, the Diels-Alder-reaction and the so-called "substituting addition" (H. Wagner, H. F. Sarx "Lackkunstharze", 1959 Karl Hanser Verlag, page 87) being the main reactions. The mol proportion of $\alpha,\beta$-unsaturated carboxylic acids to unsaturated fatty acids may vary, and naturally also depends on the type of fatty acids used; the adducts most preferred, however, are those with a proportion between 0.9:1 and 1.1:1.

Adduct formation may also be effected already with the oils, i.e. triglycerides. The saponification then takes place subsequently. It is also possible to catalyze the isomerization of the fatty acids during the formation of adducts.

By adding anti-oxidant agents, the risk of polymerization during the formation of adducts can be reduced. Relatively low viscosity oils are obtained. Additives, such as triphenyl phosphite, which affect the color favorably, permit to obtain clear adducts even when using raw material of lower quality.

Contrary to the opinion maintained generally that adducts of $\alpha,\beta$-ethylenically unsaturated dicarboxylic acids to trans-trans-isomerized fatty acids must be used to produce water-soluble synthetic resins, because polymeric polybasic products are formed when using other fatty acids, said products being unsuitable for the production of water-soluble synthetic resins (see: R. V. Crawford, P. A. Toseland, Fette. Seifen. Anstrichmittel 66, 1083 (1964) and "Farbe und Lack" 70 (1964) page 912, col. 1, lines 36 – 45, it has surprisingly been found that just the adducts of such fatty acids selected from the group consisting of maleic acid or maleic anhydride with a fatty acid selected from the group consisting of saponified natural drying oil, saponified natural semi-drying oil, tall oil fatty acids or dehydrated castor oil fatty acids wherein the reaction between said maleic acid or maleic anhydride with said fatty acid is continued to an unreacted maleic acid or maleic anhydride concentration lower than 2 percent and the molar ratio of said fatty acid to said maleic acid or maleic anhydride is between 0.9:1 and 1.1:1; and hydrolyzing said adduct to form said polybasic acids without anhydride groups are better suitable. Even when using fatty acids from dehydrated castor oil, which are used for the adduct formation in a mixture with other fatty acids, lower viscosities are obtained than with isomerized fatty acids. For demonstrating the change of viscosity of adducts depending on the fatty acid used 5 adducts have been prepared from the following mixtures:

1. 30 % dehydrated castor oil fatty acid,
   45 % distilled tall oil fatty acid, rosin contents ≈2%
   25 % maleic acid anhydride;
2. 45 % dehydrated castor oil fatty acid,
   30 % tall oil fatty acid, distilled, rosin contents<1%
   25 % maleic acid anhydride;
3. 75 % safflower oil non break,
   25 % maleic acid anhydride;
4. 75 % linseed oil fatty acid, clear,
   25 % maleic acid anhydride; and
5. 75 % distilled tall oil fatty acid, rosin contents <1%
   25 % maleic acid anhydride,
by keeping equal reaction conditions.

The fatty acid or fatty acid mixture in each case was heated to about 150°C under inert gas and the total amount of maleic anhydride was added without further heating. Thereafter the reaction mixture was heated to 200°C and was kept at this temperature until the content of free maleic anhydride had dropped to below 1 % relative to the amount used. The mixture was then cooled down to 90°C and hydrolyzation was carried out by adding 1 mol water for each mol maleic anhydride used in the presence of catalytical amounts of triethylamine and keeping the mixture at 100°C for 2 hours. After cooling to room temperature and diluting to a solids content of 66.6 % using n-butyl glycol the viscosity of each adduct was measured according to Gardner-Holdt.

For comparison a solution of the same solids content in n-butyl glycol of hydrolyzed Admerginat A was prepared, and the viscosity of this solution was measured according to Gardner-Holdt.

The data found are given in the following table:

|  | Admerginat A hydrolyzed | Adduct (hydrolyzed) | | | | |
|---|---|---|---|---|---|---|
|  |  | 1 | 2 | 3 | 4 | 5 |
| Gardner-Holdt-viscosity 66.6% in butyl glycol | T + | G-H | G + | F | H | F + |

This table shows that the viscosity of hydrolyzed adducts produced under equal condition may vary depending on the fatty acid used. It is also apparent from the above table that hydrolyzed adducts from maleic anhydride and natural fatty acids or dehydrated castol oil fatty acid respectively have a much lower viscosity than a hydrolyzed adduct of maleic anhydride and an isomerized fatty acid such as Admerginat A. These results admit the conclusion that the adducts produced from natural fatty acids, said adduct certainly containing only partly products of the general formula:

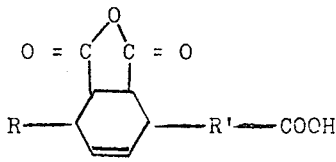

while another part will consist of amber acid substitution products formed in view of the "substituting addition" (see: Wagner-Sarx "Lackkunstharze", 1959, Karl Hanser Verlag page 87), said adducts having a lower molecular weight. With this the observation agrees that with equal viscosity, the acid number can be stronger reduced percentally at the esterification of epoxy resin reaction products of epoxy resins and monobasic fatty acids with these adducts, as is possible when using hydrolyzed adducts of isomerized fatty acids and maleic acid anhydride, such as Admerginat A. Epoxy resin partial esters of the adducts of natural fatty acids also have a better water solubility. They also have a lighter color as the adducts from natural fatty acids already have lower iodine chromatic numbers. Furthermore, by polybasic carboxylic acids, there should also be understood partial esters of polycarboxylic acids which, however, must still meet the condition to be polybasic carboxylic acids. Especially partial esters of polybasic carboxylic acids with saturated, straight chained aliphatic monoalcohols with 1 to 20 carbon atoms come into consideration. Among these, the partial esters of the above-described "tricarboxylic acids" not to be defined exactly are specially suitable, which have been obtained by adduct formation of α,β-unsaturated dicarboxylic acids or their anhydrides to unsaturated fatty acids.

Such partial esters may be obtained either:

a. by reacting α,β-unsaturated dicarboxylic acids or their anhydrides with esters of the above-mentioned unsaturated fatty acids with preferably saturated, straight-chained, aliphatic monoalcohols with 1 to 20 carbon atoms, such as methanol, ethanol, propanol, butanol, pentanol, hexanol, and the like, especially methanol, or b. by partially esterification of the adduct formed by reacting α, β-unsaturated dicarboxylic acids or their anhydrides with free unsaturated fatty acids, with preferably saturated, straight-chained, aliphatic monoalcohols with 1 to 20 carbon atoms, such as methanol, ethanol, propanol, butanol, pentanol, hexanol and the like, especially methanol.

The polybasic carboxylic acids obtained according to the methods (a) and (b) are not identical. The water-dilutable coating compounds produced with them show a different behavior for example with refernce to storage stability. Their behavior in the method according to the invention also differs, the polybasic carboxylic acids produced according to the method (b) requiring a somewhat higher esterifying temperature. The polybasic carboxylic acids obtained according to method (b) are preferred.

The production of the partial esters of epoxy groups, eventually compounds containing hydroxyl groups or such polyhydroxylic compounds as have been obtained by hydrolytic cleavage of compounds carrying epoxy groups, is effected with monobasic carboxylic acids by heating and can be accelerated in the case that reaction water is formed by adding azeotropic agents removing the reaction water, e.g. xylene, or by working at reduced pressure. It is recommended to remove the dragging agent before the subsequent esterification with polybasic carboxylic acids. The esterification is preferably effected until the acid number of the partial ester amounts to about zero.

The esterification is simplified by adding basic catalyzers, which accelerate the cleavage of the epoxy group, such as anhydrous sodium carbonate. Resins of a lower viscosity are thus obtained simultaneously.

When esterifying polybasic carboxylic acids with epoxy resin partial esters, it should be observed that when applying mixtures of polybasic carboxylic acids with carboxyl groups of different reactivity, as a rule the partial esterification should not take place simultaneously, but susequently, and in such a way that the acids with less active carboxyl groups are partially esterified at first, usually at a higher temperature, and thos with more active carboxyl groups subsequently, usually at lower temperatures. It should be acted correspondingly when anhydrides of polybasic carboxylic acids are brought to reaction.

The esterification is effected at the lowest temperature possible, so as to permit good control of the reaction. The degree of esterification is preferably chosen in such as way that the polybasic carboxylic acid is bonded to the epoxy resin or the polyhydroxyl compound by approximately one carboxyl group. A small percentage of non-reacted polybasic carboxylic acid eventually remaining in the reaction product is generally of no importance.

The quantitative proportion between epoxy groups, eventually compounds carrying hydroxyl groups or such polyhydorxyl compounds as have been obtained by hydrolytic cleavage of compounds carrying epoxy groups and mono- and polybasic carboxylic acids or eventually their anhydrides, may be varied within wide limits. It is, of course, depending on the type and size of molecules of the polybasic carboxylic acids and epoxy groups used, eventually the compounds carrying hydroxyl groups.

When producing water-dilutable coating compounds by partially esterifying epoxy resins on the basis of 2,2-bis (4) hydroxyphenyl propane and epichlorohydrin with aliphatic carboxylic acids and adducts of $\alpha,\beta$-unsaturated dicarboxylic acids to unsaturated fatty acids very good resins are obtained, when in the initial mixture the proportion of hydroxyl groups (one epoxy group is calculated as two hydroxyl groups, phenolic hydroxyl groups are disregarded) to carboxyl groups (one anhydride group is calculated as two carboxyl groups) falls within the range of 1:0.8 to 1:2. A proportion in the range of 1:1 to 1:1.4 is preferred.

When a very high carboxyl group excess is chosen, so that the epoxy resin is nearly completely esterified, a subsequent partial esterification of the epoxy resin ester with mono- and/or polyvalent alcohols may be advantageous. As monovalent alcohols, methanol, ethanol, propanol, isopropanol, butanol, iso-butanol, sec-butanol, pentanol, hexanol, etc. may be named; as polyvalent alcohols, ethylene glycol, 1,2- and 1,3-propylene glycol, 1,2-, 1,3-, 2,3-, 1,4-butylene glycol, neopentyl glycol, glycerol, trimethylol propane, trimethylol ethane, pentaerythrite, etc., may be mentioned.

The considerable increase of viscosity during esterification of high molecular epoxy resin partial esters with polybasic carboxylic acids and/or anhydrides may possibly lead to difficulties in the production. It is possible to effect the esterification in the presence of such solvents which do not participate in the esterification reaction. Solvents which are at least partially miscible with water are preferred, such as glycol or diglycol diether, ethylene glycol diethyl ether, diethylene glycol diethyl ether or ketones, such as methyl isobutyl ketone. Such solvents usually need not to be removed, as they do not affect the water dilutability of the resin. When using solvents not soluble in water, these will have to be removed before neutralization. By choosing the carboxylic acids and the quantitative proportions, it is possible to affect the properties of the resin regarding elasticity, hardness, corrosion protection, etc. of the lacquer films produced therefrom, but also e.g. the amount of precipitation when using the electrophoretic lacquering process. The mixing proportion of the components brought to reaction, the epoxy compound, mono- and polybasic carboxylic acids and the degree of esterification between epoxy resin partial ester and polybasic carboxylic acid, however, must be chosen in any case so that resins which are water-soluble or dispersible in water are produced after the neutralization with aqueous ammonia solution or strong organic nitrogen bases.

With low molecular epoxy resins, which contain a large number of epoxy groups, the reaction may be led in such a way that the reaction products with polybasic acids are indeed water-soluble arleady after the neutralization, but that the aqueous solutions still gel after some time. Generally, this property is not desired. In order to obtain a sufficient settling stability, the reaction should be prolonged until the number of the still existing epoxy groups has become small. This way of production — partial esterification of the epoxy compound with monocarboxylic acids and subsequent reaction with polybasic carboxylic acids to acid epoxy resin esters — has the great advantage that, when using unsaturated fatty acids as monocarboxylic acids, their carbon double bonds being of great importance for forming the film are fully conserved.

Curing may be accelerated by adding known catalysts, so-called siccatives.

For neutralization of the acid esters, aqueous ammonia solutions of strong organic nitrogen bases are suitable alone or in a mixture, such as triethylamine, diethylamine, trimethylamine, piperidine, morpholine, etc., especially suitable being alkylolamines, such as dimethyl ethanol amine, diethanol amine, also polyamines, such as ethylene diamine, diethylene triamine, triethylene tetramine, being used as a rule only in a mixture with monoamines. It is not necessarily required to use the theoretically calculated amount of neutralization agents for the neutralization. Frequently, a sufficient water-solubility is already obtained with a smaller amount. Tertiary, volatile strong organic amine bases, such as triethylamine and dimethyl ethanol amine are used preferably.

EXAMPLE 1

Production of the Primary Product I ("parts" always refer to parts by weight)

675 parts dehydrated castor oil fatty acid and 450 parts tall oil fatty acids are reacted in the known manner with 375 parts maleic acid anhydride under inert gas at 180° to 200°C. By adding 1.5 parts triphenyl phosphite, a considerable color improvement is obtained. As soon as the content of free maleic acid anhydride has at least passed below 2 %, the reaction product is hydrolyzed for 2 hours at 100°C (acid number approx. 340).

Production of Water-dilutable Synthetic Resin:

300 parts of an epoxy resin obtained in the known manner by reacting 2,2-bis(4) hydroxy phenyl propane with epichlorohydrin in the presence of alkali, having a melting point of 20° - 28°C, an epoxy-equivalent weight of 225 and 290 and a molecular weight of approx. 470 are esterified in a suitable reaction container equipped with an agitator, a cooler and thermometer, with 330 parts linseed oil fatty acid to an acid number of below 2.

As soon as this value is reached, the mix is cooled to approx. 100°C and 300 parts of primary product I (acid number approx. 340) are added. After short stirring the acid number is determined and a temperature of 100° to 145°C is maintained until the acid number has sunk by about one-third of the value of the mixture.

The resin is neutralized with trimethylamine in the presence of water in such a way that the pH value of a 20 % aqueous solution amounts to about 8.

EXAMPLE 2

400 parts of an epoxy resin obtained in the known manner by the reaction of 2,2-bis-(4) hydroxy phenyl propane with epichlorohydrin in the presence of alkali, having a melting point of 64° to 76°C, an epoxy equivalent weight of 450 to 525 and a molecular weight of approx. 900, are esterified in a suitable reaction container, equipped with an agitator, a cooler and thermometer, with 373 parts linseed oil fatty acids at 220° to 230°C in the presence of 0.5 parts anhydrous sodium carbonate to an acid number of below 2. To accelerate the reaction, work is effected under slight vacuum. After reaching the acid number, the product is cooled and 427 parts primary product I are added at below 150°C. The temperature is then maintained at 140°C, until the acid number has sunk by about one third of its original value, i.e. the mixture of epoxy resin partial ester and primary product I. As soon as the acid number is reached, 8 % ethylene glycol monoethylether acetate and 10 % ethylene glycol monoethylether are added. After adding approx. 10 % water, the preparation is neutralized with diisopropanol amine. The 20 % aqueous solution of the resin has then a pH value of 8.0 ± 0.2.

EXAMPLE 3

350 parts of an epoxy resin obtained in the known manner by reacting 2,2-bis-(4) hydroxy phenyl propane with epichlorohydrin in the presence of alkali, having a melting point of 95° to 105°C, an epoxy equivalent weight of 870 to 1025 and a molecular weight of approx. 1400, are esterified in a suitable reaction container which is equipped with an agitator, a cooler and thermometer, with 300 parts linseed oil fatty acid under inert gas at 220° to 230°C in the presence of 0.3 parts anhydrous sodium carbonate to an acid number of below 2. The product is cooled and 400 parts of the primary product I are added below 150°C. Immediately after the mixing the acid number is determined. The preparation is then maintained at 145°C, until the acid number has sunk by nearly one third. After the finished reaction, the preparation is diluted, with 16 % ethylene glycol monobutylether and neutralized with dimethyl ethanolamine, after adding approx. 10 % water. The 20 % strength by weight aqueous solution should have a pH value of approx. 7.8 to 8.5. The resin is dilutable with water in any proportions.

EXAMPLE 4

332 parts of an epoxy resin as described in example 1 having a molecular weight of approx. 470, are esterified with 220 parts linseed oil fatty acids and 112 parts 4,4-bis-(4)-hydroxy phenyl-valerianic acid at 220°C until an acid number of below 2. The preparation is then cooled and 350 parts of the primary product I are added below 150°C. After a short mixture, the acid number of the mixture is determined. The preparation is then maintained at 100° to 130°C, till the acid number has sunk by about one third of the value of the mixture. When the reaction is finished, the preparation is diluted with 95 parts ethylene glycol mono ethylether. The resin is soluble in water after neutralization with triethyl amine and provides water-resistant films after being baked (25 minutes at 170°C).

A bath solution suitable for electrophoretic painting is prepared as follows: 10 kg of a 40% solution of the resin according to examples 1 to 6 and 8 are ground with 2 kg of iron oxide red in a pebble mill and diluted with distilled water to a solids content of approx. 10 %. For the electrophoretic painting, the metallic body is dipped into the bath as anode. When using a continuous voltage of approx. 100 V, the body is uniformly coated with the resin produced according to the invention. By adding limited amounts of suitable organic solvents miscible with water, for example ethylene glycol mono ethylether, ethylene glycol monobutylether, the thickness of the layer deposited may be increased. By baking at 170° to 190°C (30 to 20 minutes) a highly corrosion-resistant coating is obtained.

EXAMPLE 5

405 parts of an epoxy resin obtained in the known manner by reacting 2,2-bis-(4)-hydroxy phenyl propane with epichlorohydrin in the presence of alkali, having a melting point of 64° to 76°C, an epoxy equivalent weight of 450 to 525 and a molecular weight of approx. 900, are esterified in a suitable reaction container with 230 parts tall oil fatty acids at 180°C in the presence of 0.5 parts anhydrous sodium carbonate until an acid number of below 2 is reached. The reaction product is cooled and mixed with 440 parts primary product I at about 100°C. Then a temperature of 140° to 150°C is maintained, until the acid number has sunk by about 30 to 35 units over that of the mixture. After termination of the reaction, the resin is neutralized with triethyl amine in the presence of water, until a 20 % aqueous solution shows a pH value of approx. 8.

EXAMPLE 6

500 parts of an epoxy resin obtained in the known manner from 2,2-bis-(4)-hydroxyphenyl propane with epichlorohydrin in the presence of alkali, having a melting point of 125° to 132°C, an epoxy equivalent weight of 1650 to 2050 and a molecular weight of approx. 2900, are esterified in a suitable reaction container with 430 parts linseed fatty acids until an acid number of below 2 is reached. The esterification is effected in the presence of 0.45 parts anhydrous sodium carbonate in the xylene cycle. After completion of the esterification, the xylene is distilled off in vacuum and the resin is diluted with 6-methoxy hexanone to a solids content of approx. 75 %. At about 100° to 110°C the epoxy resin partial ester is reacted with 570 parts of hydrolyzed primary product I, until the 50 % viscosity, measured in ethylene glycol monobutylether, amounts to W. (Gardner viscosity scale). It is then diluted with ethylene glycol monoethyl ether to about 70 % solids content and neutralized with triethylamine in the presence of water, until the pH-value of 20 % aqueous solution amounts to about 8.

EXAMPLE 7

400 parts of an epoxy resin being prepared in a known manner from 2,2-bis (4)-hydroxy phenyl propane and epichlorohydrin in the presence of alkali and having a melting point of 52° to 56°C (Durran) and having an epoxide equivalent weight of 390 to 440 are esterified in a suitable reaction container with 370 parts of light-colored linseed oil fatty acid at 220° to 230°C in the presence of 0.5 parts 40 % strength by weight solution of benzyl trimethyl ammonium hydroxide until an acid number of below 5 is obtained. The viscosity should be 500 to 600 cP at 20°C measured as 66 % strength by weight solution in ethylene glycol monobutylether. The mix is cooled to 100°C and 420 parts of primary product I is added. Esterification is carried out at 170°C until the acid number is about 80 to 85 and the viscosity is 1200 to 1600 cP at 20° C. The reaction product is cooled and is diluted at about 120°C using 220 parts of ethylene glycol monoethylether. The obtained resin is neutralized with aqueous diethyl amine until the pH value of a 10 % aqueous solution amounts to about 8. This 10 % aqueous solution is excellently suitable for electrophoretic deposition. The deposited coatings are stoved at 170° to 200°C for 30 minutes. The coatings can be used for electro isolating of wires and ribbons.

Production of the Primary Product II 30 parts dehydrated castor oil fatty acid, 45 parts distilled tall oil fatty acids with a rein content resin approx. 1 % are converted in the known manner with 25 parts maleic acid anhydride under inert gas at 180° to 200°C. By adding 0.1 parts triphenyl phosphite, a considerable color improvement is achieved. As soon as the content of free maleic acid anhydride has sunk to below 1 % of the amount applied, the reaction product is hydrolyzed by adding 4.3 parts water for 2 hours at 100°C.

Production of the Water-Dilutable Water-dilutable Resin 40 parts of an epoxy resin obtained in the known manner by reacting diphenyol propane (bisphenol-A) with epichlorohydrin in the presence of alkali, having a melting point of 52° – 56° C and an epoxy equivalent weight of 390 - 440, are esterified in a suitable reaction container equipped with an agitator, cooler and thermometer, with 37 parts linseed oil fatty acid, (clear) under inert gas, up to an acid number of below 2. The temperature of esterification amounts to 230° – 240°C and the esterification is effected in the presence of 0.022 parts anhydrous sodium carbonate. The product is then cooled and the preparation is mixed at 140°C with 42 parts of the primary product II and esterified below 160°C. until thte viscosity amounts of X-Y, 2:1 in butyl glycol (Gardner Holdt). The acid number at this moment amounts to approx. 80 to 85. Below 120°C, the product is mixed with 20 parts ethylene glycol monoethyl ether and filtrated at 100°C by using filtering auxiliary means through a layer filter. 84 parts of the filtrated matter are mixed with 8.5 parts distilled water and neutralized with approx. 6–7 parts triethyl amine below C, c, until the pH-value of a 20 % aqueous solution amounts to approx. 7.6 to 7.8. This resin is highly suitable to be used as electrophoretically precipitable coating compound. In order to produce highly corrosion-resistant films, the baking temperature should amount to 170° – 200°C.

EXAMPLE 8

220 g 2,2-(Bis-(p-2,3-epoxy propyloxy)-phenyl)-propane are mixed with 280 g dehydrated castor oil and heated to 230°C until the acid number has dropped to below 3 and then cooled. 160 g of primary product I are added and the mix is heated to 150°C until the acid number reaches 60. The obtained resin is diluted to a solids content of 80 % by weight with isopropyl glycol and neutralized using triethyl amine.

COMPARISON TESTS TO PROVE THE ADVANCE OVER THE STATE OF THE ART

1. A resin made according to example 5 of this invention. The resin was diluted using ethylene glycol monoethyl ether to a solids content of 70 % by weight.

The resin was then being abraded with a mixture of equal parts of titanium dioxide and aluminum silicate having then a pigment/binding agent ratio of 0.3:1. The pigment paste was then neutralized using dimethylethanol amine and was diluted with deionized water until the solids content amounts to 13 % by weight.

Ungreased steel sheets were coated with a thickness of layer of 22 to 25 $\mu$ using the above bath for electrophoresis. The coated sheets were cleaned with deionized water and stoved at a temperature of 170° C for 30 minutes.

2. (over Spalding) A resin was made according to example 2, but instead of the there used primary product I an adduct is used which has been obtained by the reaction of 675 parts of dehydrated castor oil fatty acid and 450 parts of tall oil fatty acid with 444 g of fumaric acid at the temperature of 200°C. The reaction mixture gelatinized when being heated without having formed a water-soluble product previously.

3. (over Spalding) A resin was made according to Example 4 of this invention and another one according to example 4, whereby the there used adduct was replaced by the fumaric acid adduct described by Spalding. Both resins were diluted to a solids content of 70 % by weight using ethylene glycol monoethyl ether. The resins were then being abraded with a mixture of equal parts of titanium dioxide and aluminum silicate having then a pigment/binding agent ratio of 0.3:1.

The pigment paste was then neutralized using dimethyl ethanol amine and was diluted with deionized water until the solids content amounted to 13 % by weight. Substantial difficulties are presented by diluting the resin which contains the fumaric acid adduct because it has been difficult to overcome the increase of viscosity which happens during addition of water. Ungreased steel sheets were coated electrophoretically in both of the above electrophoresis bathes. Hereby it became apparent that by the one containing the fumaric acid adduct only coats of a thickness of about 10 μ can be made, while the other binding agent does make it possible to get coats 25 μ thick.

4. (over Tanner) A resin is made according to example 5 of the invention but instead of the primary product I the same amount of the adduct is used that has been described in example 4 of the U.S. Pat. No. 3,355,401. The reaction mixture gelatinized at 130° C after 30 minutes.

5. (over Tanner) A resin was made according to example 4 of this invention, but instead of the primary product I the same amount of the adduct is used that has been described in example 4 of the U.S. Pat. No. 3,355,401. The resin is then pigmentated and diluted as described under number 3. From the electrophoresis bath only coats on steel sheets can be made electrophoretically having layers no more than 12 μ thick.

6. (over Pattison) Two resins are made according to example 6 of this invention and according to example 7 of the U.S. Pat. No. 3,308,077. Both resins were diluted to a solids content of 70 % by weight using ethylene glycol monoethyl ether.

The resins were then being abraded with a mixture of equal parts of titanium dioxide and aluminum silicate having then a pigment/binding agent ratio of 0.3:1. The pigment paste was then neutralized using dimethyl ethanol amine and was diluted with deionized water until the solids content amounted to 13 % by weight. Ungreased steel sheets were coated with a thickness of layer of 22 to 25 μ using the above bath for electorphoresis. The electrophoresis bathes were kept at 40°C while being stirred. After 24 hours anew ungreased steel sheets were coated electrophoretically. Hereby perfect coats are obtained using the resin made according to example 6 of the invention. The coats made by the resin according to example 7 of the U.S. Pat. No. 3,308,077 are severely damaged. Spongy film splitting and strong dimples occur, so that the coats have to be specified as being unusable.

7. A resin was produced according to example 7 of the U.S. Pat. No. 3,308,077 to Pattison. The resin was diluted to a solids content of 70 % by weight using ethyleneglycol monoethylether. The mixture was neutralized to a pH-value of 7.8 to 8.0 using dimethyl ethanolamine and ground with a mixture of equal parts of titanium dioxide and aluminum silicate in a pigment binder ratio of 0.3:1. The pigment paste was diluted to a solids content of 12 % by weight using deionized water. From this mixture an electrophoresis bath was made. In this electrophoresis bath zinc phosphatized sheets were coated with thickness of layer between 22 and 26 μ, which were rinsed with water and stoved at a temperature of 170°C after short time of airdrying. The electrophoresis bath was stored at a temperature of 40°C while being stirred. After 24 hours anew zinc phosphatized sheets were coated. The deposition was disturbed strongly. Blister formation and dark-colored sedimentation on the film made the coatings worthless. After comparable storage at 40°C of the electrophoresis bath made according to the preesnt invention, unobjectionable coatings can be obtained even after 50 hours' storage-time.

8. An adduct was prepared from 280 g tall oil fatty acid and 96 g maleic anhydride at 200°C, according to Example 6 of U.S. Pat. No. 3,308,077 to Pattison.

The content of free maleic anhydride was ascertained titrimetically in relation to the reaction time in two parallel tests.

The following table shows these test results:

| reaction time (hours) | content of free MA Test 1 | Test 2 |
|---|---|---|
| 2.5 | 15 % | 16 % |
| 3.0 | 9 % | 8.5 % |
| 3.5 | 5 % | 5.5 % |
| 4.0 | 3.5 % | 3.3 % |

Even after prolonged reaction time of 4 hours, the content of maleic anhydide still amounted to above 3 %. Such a high content of acidic material induces a low storage stability to the resinous bath solution.

9. A resin was made according to example 4 of the U.S. Pat. No. 3,355,401 to Tanner. The xylene was removed by vacuum distillation and the dilution was carried out as described in test 7. Just as described in test 1 an electrophoresis bath was prepared from the mixture whereby the dilution of the highly viscous mixture however, did present considerable difficulties and could be carried through only with the aid of strong stirrers. Using this electrophoresis bath zinc phosphatized sheets could only be covered with a thickness of layer of about 14 μ even by applying a voltage of 350 Volts. The film was bursting under higher voltages. The coated sheets were stoved as described in test 7.

10. Test 9 was repeated but instead of the tricarboxylic acids described by Tanner the same amount of "preliminary product I" of the present invention was used for the production of the resin. The working up and dilution of the considerably lower viscous resin mixture made no difficulties. In this electrophoresis bath zinc phosphatized sheets were coated without difficulties to a thickness of layer of 22 to 26 μ.

The plates coated according to tests 9 and 10 were subjected to the salt spray test (ASTM B/177/61) and looked at after 150 hours. The results are shown in Table 2

|  | Swell width (mm) | Surface 1=best value | Edge 5=worst value |
|---|---|---|---|
| Resin of Test 9 | 6 | 5 | 5 |
| Resin of Test 10 | 3 | 1 | 1 |

From these tests the following conclusions can be made:

a. According to test 7 electrophoresis bathes can be obtained using epoxy resins made as described in U.S. Pat. No. 3,308,077 to Pattison which are not stable because of their high content of free maleic anhydride. The adduct produced according to Pattison contains about 15 % by weight of the maleic anhydride not combined chemically according to analytical investigation (Test 8).

b. Carrying out the process of U.S. Pat. No. 3,355,401 (Tanner Example 4) is very critical since three out of five reaction mixtures gel after 30 to 60 minutes reaction time in the second stage The gelling starts long before complete esterification of the epoxy resin took place and before the esterified product became water-soluble. After complete esterification the obtained product is highly viscous and is practically not capable of being pumped into technical installations for electrophoretic deposition. If one succeeds in electrocoating by use of this product the thickness of the achieved layers is too small to secure corrosion resistive properties (Table 1). When proceeding from the working method of Tanner to the working method of the present invention epoxy resin esters are obtained which can be diluted more easily and which give coatings of good corrosion resistance (Test 10).

11. An epoxy resin partial ester was made according to example 4 of the U.S. Pat. No. 3,305,501 to Spalding. The resin was diluted using ethyleneglycol monoethylether as described in Test 7. From this mixture an electrophoresis bath was made as described in Test 7. In this electorphoresis bath zinc phosphated sheets were coated with a thickness of layer between 22 and 26 $\mu$ and stoved as described in Test 7. The plates were subjected to the salt spray test (ASTM B-117-61) and looked at after 150 hours. The results are shown in Table 3.

Table 3

|  | Swell width | Surface 1=best value | Edge 5=worst value |
|---|---|---|---|
| Resin of Test 11 | 12 | 4 | 5 |

Although Spalding did in fact intend to avoid gelation by employing a non-anhydride forming acid, using the instructions given in the examples by Spalding, coatings are obtained that do not have such highly valuable properties after application and stoving because of their relatively high content of non-reacted fatty acids. In column 2, lines 58 – 63 (of Spalding) there is said that also adducts of fumaric acid and fatty acid in the molar ratio 1:1 can be used for producing the compositions of the invention. No resin can be produced using this molar ratio because the composition gelatinizes.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly equitable, and intended to be, within the full range of equivalence of the following claims.

What is claimed is:

1. A method for producing water-dilutable coating compositions suitable for electrocoating which comprises partially esterifying glycidylethers based on 2,2-bis(4-hydroxyphenyl) propane containing epoxy groups or hydroxyl groups produced by hydrolytic cleavage of said epoxy groups with at least one monocarboxylic acid, in the ratio of about 1:1 of carboxyl groups to epoxy groups, at a temperature of about 180° to 230°C, further esterifying said partial esters with polybasic carboxylic acids and neutralizing the product with strong nitrogen bases in the presence of water, the improvement comprising preparing said polybasic carboxylic acids without anhydride groups by:

a. forming an adduct of a compound selected from the group consisting of maleic acid or maleic anhydride with a fatty acid selected from the group consisting of saponified natural drying oil, saponified natural semi-drying oil, tall oil fatty acids or dehydrated castor oil fatty acids wherein the reaction between said maleic acid or maleic anhydride with said fatty acid is continued to an unreacted maleic acid or maleic anhydride concentration lower than 2 percent and the molar ratio of said fatty acid to said maleic acid or maleic anhydride is between 0.9:1 and 1.1:1; and b. hydrolyzing said adduct to form said polybasic acids without anhydride groups.

2. The method of claim 1, wherein in step (a) the reaction between maleic acid or maleic anhydride with the fatty acid is continued until the concentration of unreacted maleic acid or maleic anhydride is lower than 1 percent.

3. The method of claim 1, wherein said monocarboxylic acids are fatty acids with 4 to 30 carbon atoms obtained by saponification of natural fats.

4. The method of claim 1, wherein said monocarboxylic acids are rosin acids selected from the group consisting of partially and completely hydrogenated rosin acids.

5. The method of claim 1, wherein said strong nitrogenous bases are selected from the group consisting of triethylamine, diethyl amine, trimethyl amine, piperidine, morpholine, dimethylethanol amine, diethanol amine, triethanol amine, diisoproponal amine, ethylene diamine, diethyl triamine and diethylene tetramine.

6. The method of claim 1, wherein the molar ratio of free hydroxyl groups, wherein one epoxy group is considered as equivalent of two hydroxyl groups, to free carboxyl groups, wherein one anhydride group is considered as equivalent of two carboxyl groups, in the epoxy resin partial ester is 1:0.8 to 1:2.

7. The method of claim 1, wherein said glycidylethers based on 2,2-bis (4) hydroxyphenyl propane have molecular weights of 380 – 3500.

8. The method of claim 1, wherein said drying and semidrying oils are selected from the group consisting of linseed oil fatty acids, safflower oil fatty acids, tall oil fatty acids and dehydrated castor oil fatty acids.

* * * * *

UNITED STATES PATENT OFFICE
CERTIFICATE OF CORRECTION

Patent No. 3,878,145     Dated April 15, 1975

Inventor(s) Rolf Güldenpfennig

It is certified that error appears in the above-identified patent and that said Letters Patent are hereby corrected as shown below:

[73] Assignee: Hoechst Aktiengesellschaft, Frankfurt, Germany

| | |
|---|---|
| Col. 1, line 7 | "10" should read -- 20 --. |
| Col. 1, line 28 | "accordingly" should read -- according --. |
| Col. 5, line 57 | "along" should read -- alone --. |
| Col. 6, line 4 | insert a comma (,) after "1,3" |
| Col. 9, line 28 | change "2%" to -- 1% --. |
| Col. 10, line 5 | "castol" should read -- castor -- |
| Col. 15, line 41 | insert --resin-- after "aqueous" |
| Col. 15, line 60 and 61 | "Water-Dilutable Water-dilutable Resin" should be --"Water-Dilutable Synthetic Resin -- |
| Col. 16, line 14; | "C,c" should read -- 40°C --. |
| line 6 | "thte" should read -- the --. |

Signed and Sealed this second Day of December 1975

[SEAL]

Attest:

RUTH C. MASON  
Attesting Officer

C. MARSHALL DANN  
Commissioner of Patents and Trademarks